United States Patent [19]

Gjovaag

[11] Patent Number: 5,455,952
[45] Date of Patent: Oct. 3, 1995

[54] METHOD OF COMPUTING BASED ON NETWORKS OF DEPENDENT OBJECTS

[75] Inventor: Inghard J. Gjovaag, Portland, Oreg.

[73] Assignee: Cardinal Vision, Inc., Wilsonville, Oreg.

[21] Appl. No.: 411,855

[22] Filed: Mar. 28, 1995

Related U.S. Application Data

[63] Continuation of Ser. No. 147,127, Nov. 3, 1993, abandoned.

[51] Int. Cl.$^6$ ......................................................... G06F 9/445
[52] U.S. Cl. ......................... 395/700; 364/280; 364/280.9; 364/DIG. 1; 395/12; 395/100
[58] Field of Search ......................... 395/700; 364/DIG. 1

[56] References Cited

U.S. PATENT DOCUMENTS

| | | | |
|---|---|---|---|
| 4,754,395 | 6/1988 | Weisshoar et al. | 364/200 |
| 4,821,220 | 4/1989 | Duisberg | 364/578 |
| 4,866,638 | 9/1989 | Cosentino et al. | 364/521 |
| 5,021,976 | 6/1991 | Weyelblat et al. | 364/521 |

OTHER PUBLICATIONS

"Visualization in Scientific Computing (ViSC); Definition, Domain and Recommendations," *Computer Graphics*, the ACM Siggraph Journal, vol. 21, No. 6, Nov. 1987, pp. i–D–8.

"The Future of Visual Computing" (a marketing brochure), Advanced Visual Systems, Inc., Waltham, Mass., Copyright 1992.

Artificial Intelligence and the Design of Expert Systems by George F. Luger, William A. Stubblefield.

*Primary Examiner*—Kevin A. Kriess
*Assistant Examiner*—Majid A. Banankhah
*Attorney, Agent, or Firm*—Stoel Rives Boley Jones & Grey

[57] ABSTRACT

An object dependency network-based data visualization system allows a user to graphically edit a network of displayed objects and their interconnections to specify an underlying data computing and data visualization process. Each displayed object is selected by the user from among a menu of objects representing data structures and functions such as data fields to be analyzed, mathematical operations, data input functions, and display manipulation functions. The user graphically draws lines interconnecting ports on the objects that have underlying data structure addresses that establish and control a data and operational flow through the underlying computer-driven process. The underlying process is continually running but only performs a particular computation in response to a data change or state change associated with any of the objects in the network. Thereby, an improved data visualization system is provided that minimizes memory usage and computation time while maintaining accuracy of the computed results, which is particularly beneficial when analyzing data derived from very large data structures such as scalar, vector, and tensor data fields.

13 Claims, 5 Drawing Sheets

METHOD OF COMPUTING BASED ON NETWORKS OF DEPENDENT OBJECTS

This is a continuation of application Ser. No. 08/147,127, filed Nov. 3, 1993, now abandoned.

TECHNICAL FIELD

This invention relates to data processing systems and more particularly to a method for extracting, processing, and displaying meaningful data derived from among large fields of raw data.

BACKGROUND OF THE INVENTION

Technologically advanced industries such as aircraft, aerospace, automotive, nuclear, and structural engineering commonly use computers to design products for their marketplace. Being successful in such markets often requires that prototype computer models of the products be analyzed to reduce time-to-market, improve product quality, reduce design and manufacturing costs, and avoid product liability. However, such product-related goals cannot be realized unless the analysis data generated can be readily analyzed and understood.

A secondary market has developed to address the above-described data analysis requirement. The resulting proliferation of computer-aided analysis programs has caused the generation of vast amounts of data and information, but understanding and using the data remains a problem.

The National Science Foundation addressed the problem by sponsoring a study of the visual depiction and manipulation of scientific and engineering data, the results of which were described in "Visualization in Scientific Computing (ViSC): Definition, Domain and Recommendations," Computer Graphics, the ACM Siggraph Journal, Vol. 21, No. 6, November 1987. The report covered a wide range of engineering disciplines, confirmed that the problem of understanding massive amounts of data is pervasive and concluded that humans can best understand such data by using computer graphics to manipulate the data visually. The report then specified that proposed solutions include a means for performing the desired manipulations on the raw data and a means of visually analyzing the processed data.

However, in practice, the needed information is often only implied by the raw data and must be further processed in some way to extract understandable and useful results. Moreover, computer graphics technology has limitations that create barriers to effectively displaying highly complex multidimensional data.

Therefore, prior attempts to solve the data manipulation and visualization problem across a broad range of applications has not provided useful results, because the application needs and data types are diverse and work together to defy a single unified solution.

For example, the Application Visualization System ("AVS"), marketed by Advanced Visual Systems, Inc. of Waltham, Mass., employs a visually based programming language to interconnect networks of software modules, each of which performs a predetermined function on a data structure. AVS uses a dataflow execution model in which each module must receive fully computed data structures from all its antecedent data structures before performing its defined computation. The result of the computation is stored in a predefined data structure that is then used as the input to dependent modules.

Unfortunately, AVS and its dataflow model often use excessive memory to create the data structures resulting from performing complete evaluations of each module. Large amounts of computing time may be required to generate data that may never be needed. Also computations by a module must be performed using the data structures generated by the antecedent modules often resulting in a loss of numerical accuracy because the module cannot directly access the primary data sources.

In 1988, workers at Tektronix, Inc., Beaverton, Oreg., realized that computer-graphics-based visualization techniques could be used to understand scalar vector, and tensor field data that are generated by commercially available finite element and finite difference analysis programs. A set of visualization concepts was formed and a prototype software system referred to as "Discovery" was developed for use on graphic workstations. Discovery was based upon a number of concepts and goals including an object-oriented architecture, attention to accuracy of results, efficient use of computer resources, and a fundamental flexibility that allowed and encouraged experimental exploration of complex analysis data.

Discovery included a programming construct referred to as a "tool" and employed a simple form of deferred evaluation whereby a query of a virtual state of a tool resulted in the complete state being computed. Execution was controlled by a centralized programs referred to as a "Task Manager," that maintained a list of tools that were ready to perform a predetermined computation and scheduled the computations in an arbitrary order.

Unfortunately, Discovery also required large amounts of memory and processing time but did not perform a complete computation unless specifically requested to do so.

What is needed therefore, is a scientific data visualization system having the flexibility to extract, process, and display useful data that are derived from a wide range of complex data and application types. Users having a wide range of disciplines and skill levels should be able to effectively use the visualization system and should think of their visualization problems in familiar, non-computer-science terms. Of course, memory and computing resources should be efficiently used, and data accuracy should be preserved.

SUMMARY OF THE INVENTION

An object of this invention is, therefore, to provide a system and a method for extracting, processing, and displaying data that are derived from a wide range of complex data and application types.

Another object of this invention is to provide a data visualization system and method that is flexible and easy to use.

A further object of this invention is to provide a data visualization system and method that efficiently uses memory and computing resources.

Still another object of this invention is to provide a data visualization system and method that maintains data accuracy.

Accordingly, this invention provides an "object dependency model" for specifying the step order and data access locations of a computational process. The model employs object-oriented techniques by which computations are performed by objects and are scheduled by a change of state of other objects and/or by the need for a result of the computation.

The object dependency model is advantageous where complex computations are performed on large data structures in response to interactive user requests. The object dependency model uses minimal computer memory and computation time while maintaining accuracy of the computed results.

A data visualization system using the object dependency model performs computations on very large data structures representing scalars vector, and tensor fields. The system includes a graphic block editor subsystem that allows a user to graphically draw a network that specifies the sequence of computations and data interdependencies in a simple intuitive manner.

Additional objects and advantages of this invention will be apparent from the following detailed description of a preferred embodiment thereof which proceeds with reference to the accompanying drawings.

DETAILED DESCRIPTION OF PREFERRED EMBODIMENT

Figure 1:
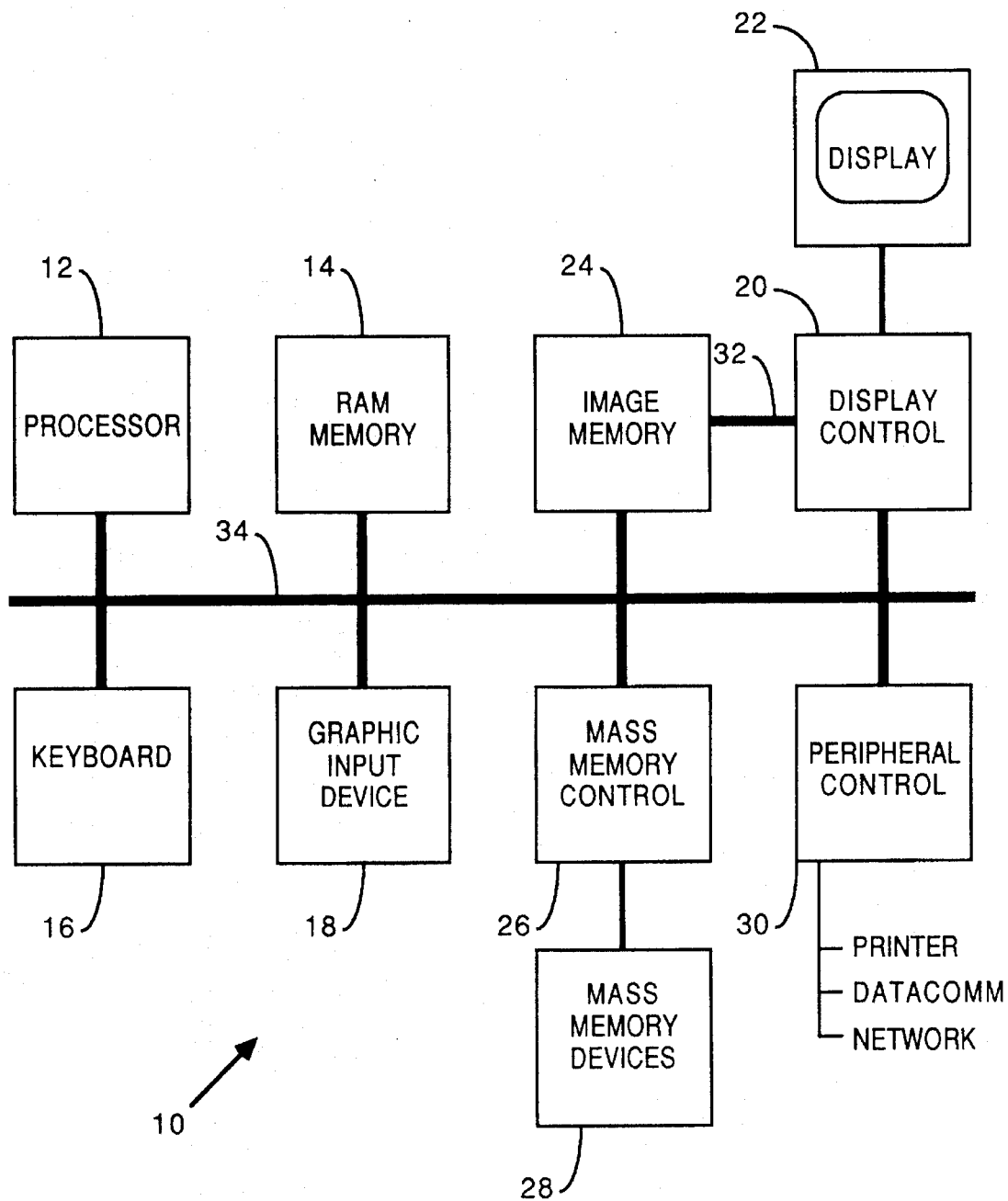
FIG. 1 is a simplified block diagram of an exemplary prior art computing system such as one employing the computing method of this invention.

FIG. 1 shows a prior art computing system 10 suitable for employing the computing method of this invention. Computing system 10 may be one such as the model Indigo2 manufactured by Silicon Graphics, Inc. of Mountain View, Calif. Other computing systems may be used, provided they include at least a processor 12; a RAM memory 14 for storing programs, data, and operating code; a keyboard 16; a graphic input device 18 such as a mouse or graphic tablet; a display controller 20; and a display 22 such as a color raster scanned monitor. Some computing systems enhance performance and user flexibility by the addition of an image memory 24, a mass memory controller 26, mass memory devices 28 such as floppy and hard disk drives, and a peripheral controller 30 for operating devices such as printers, data communications interfaces, and network ports. The above-described computing system elements typically transfer data, instructions, and programs across a local bus 32 and/or a system bus 34.

Computer system 10 operates on a variety of data types such as integers and floating point numbers. A data type typically includes a set of "elements" associated with a set of "operations" that are performed on the elements. This invention further includes "fields" as a new data type together with a system for manipulating and viewing fields. An extensive variety of operators and functions supports the mathematical basis of fields. However, only a small set of simple concepts is needed to support visualization of field data in a uniform way across a variety of engineering disciplines and applications.

The following definitions provide a framework for understanding some of the data types used by this invention.

A "field" is a function that maps points in a set D, referred to as a "domain," into a set V of "values," the elements of which may be "scalars," "vectors," or "tensors." A field may be expressed mathematically as F: D→V.

In this invention a domain is typically a set of points in one-, two-, or three-dimensional ("3D") space, denoted respectively by R, $R^2$ and $R^3$. A domain has the mathematical property of continuity which supports analogous physical concepts such as a wire, metal sheet, or solid object.

Fields can express many other physical concepts. For example, a "scalar" is a single real or complex number. Physical concepts represented by scalars include pressure and temperature.

A "vector" is a mathematical entity that generally represents a magnitude and a direction. Physical concepts represented by vectors include anything having a direction associated with a quantity, such as displacement, velocity, and acceleration. For a given N-dimensional coordinate system, a vector can be represented as an ordered sequence of N scalar values.

A "tensor" is a mathematical entity that is more general than a vector. Physical concepts represented by tensors include stress and strain. For a given N-dimensional coordinate system, an N by N array of $N^2$ scalar values can represent a "general tensor." Fewer scalar values, more precisely $N(N+1)/2$, can represent a "symmetric tensor" which is a special case of the general tensor.

A "scalar field" associates a scalar with each point within the domain. A physical example of a scalar field is a room wherein the interior of the room is the domain and a temperature (a scalar) is associated with each point in the room.

A "vector field" associates a vector with each point within the domain. A physical example of a vector field can be found in the same room. Each point in the room has a vector pointing in the direction of maximum temperature change with the magnitude of the vector being the rate of change.

A "tensor field" associates a tensor with each point within the domain. A physical example of a tensor field is a mechanical part, such as a connecting rod, which is subject to a set of forces. Each point in the connecting rod has a tensor representing the stress at the point.

The following definitions provide a framework for understanding some of the object-oriented programming concepts used by this invention. The terminology and some of the concepts used are similar to those found in the Smalltalk language. Skilled workers will recognize that the concepts of this invention may be implemented in any other reasonably complete object-oriented language, such as the preferred language, C++.

A "class" is a description of a set of data structures called "members," which together with a description of a set of "messages" are understood by the class. The messages are interpreted by computer procedures called "methods." Every message belonging to a class has a corresponding method.

An "object" is an actual instance of the data structures described by a class. A message of a class can be sent by an object to any other object which is an instance of that class. Sending a message to an object may produce a "response" which is a data structure returned to the sender by the method that interpreted the message.

An "internal state" of an object refers to the values of its members. The internal state of an object is not typically directly accessible by any code other than the code implementing the class methods. A set of messages is usually provided for accessing and altering certain aspects of the internal state of the object.

A "subclass" is a class that shares the members and messages of another class and that either adds new messages and/or new members or overrides existing messages by redefining them.

The following definitions provide a framework for understanding the concepts of object dependency networks such as those used in this invention.

An "object dependency network" is composed of instances referred to as "tools," a special set of classes called "tool classess," and "dependency relationships" existing between tools. A dependency relationship exists between an "antecedent" tool and a "dependent" tool.

All tool classes are subclasses of a "base class" referred to as the "Kernel class." The Kernel class implements all the methods necessary for managing dependency relationships.

Tools belong to a hierarchy of "types" composed of the lowest level name of the tool class followed by the superclass tool name at the next level up and ending with the Kernel class at the highest level. Each tool class defines a set of "input ports" that determines how many antecedents a tool may have and what type of tools can be used as antecedents. A dependency relationship is created when an antecedent tool is connected to an input port of a dependent tool. An input port can be connected to only one antecedent tool. However an antecedent tool can be connected to any number of dependent input ports.

Each input port has a "type" that defines what tools may be connected to it. A tool may be connected only to an input port having a type that matches one of the types in the type hierarchy for the tool. Therefore, any tool can be connected to an input port of the Kernel type.

When a dependency relationship exists between tools, the antecedent tool must send an "update message" to all its dependent tools whenever the antecedent tool changes in any way that the dependent tool needs to know.

Figure 2:
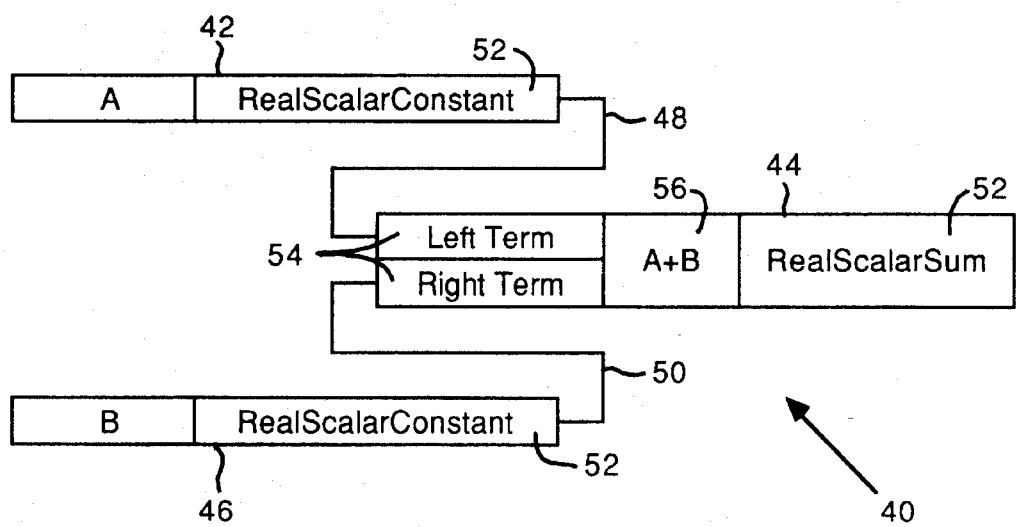
FIG. 2 is a block diagram representing an object dependency network for specifying a program that computes a real scalar sum of two scalar constants in a manner according to this invention.

FIG. 2 graphically depicts a simple object dependency network 40. Tools 42, 44 and 46 are represented by blocks. Lines 48 and 50 establish dependency relationships between the tools. In this case, tool 44 is dependent on antecedent tools 42 and 46. Each tool includes a name block 52 that is labeled with the name of the tool class to which the tool belongs. Lines originate at name blocks 52 and terminate at an input port 54 of dependent tool 44. Each input port 52 is labeled with a description of its use. Tools may also include a label block 56 for further describing the function the tool represents.

The purpose of a tool is to represent the result of some computation. The result may be as simple as a numeric value or as complex as a tensor field defined over a complex region of 3D space. Tools conceal their internal state from all procedures except their own methods. Therefore, details concerning the computation result are obtained by sending an "inquiry message" to a tool. The "virtual state" of the tool determines the response to the inquiry message. Note that the virtual state and the internal state of a tool may be different. If two tools produce identical responses to all identical inquiry messages, then they have the same virtual state even though their internal states may differ. The virtual state of a tool is the computation result the tool represents.

The virtual state of a tool is not ordinarily changed by a dependent tool. It follows that the result of a computation should not be influenced by its recipient. The virtual state of a tool is most commonly changed by an antecedent tool result or by some external event such as a signal from keyboard 16 or graphic input device 18 (FIG. 1). However, the internal state of a tool is often changed by a dependent tool.

The virtual state of a tool may be either "available" or "unavailable." If the virtual state is available, then the tool will respond correctly to inquiry messages. If the virtual state is unavailable, then the tool response is undefined. The virtual state of a tool is generally available whenever the virtual states of its antecedents are available. However, this is not a requirement.

Tool classes that perform a computation are subclasses of the class that represents the type of the computed result. For example, referring to FIG. 2, the sum of two real numbers is represented by tool 44, the virtual state of which is the sum A+B of the values received by querying the virtual state of antecedent tools 42 and 46. Tool 44 is an "instance" of a RealScalarSum class, which is a subclass of a RealScalar class. Therefore, the virtual state of tool 44 represents a real number, and tool 44 can be connected to any input port 54 with a type requiring a RealScalar.

Some classes of tools can respond to more than one type of inquiry message. Each message type queries a different aspect of the virtual state of the tool. For example, assume a tool has a virtual state representing a scalar field over a domain. The tool may receive separate inquiry messages requesting the scalar value of the field at a point, the value of a derivative along an axis at a point, and/or the maximum or minimum value of the field over its domain.

Figure 3:
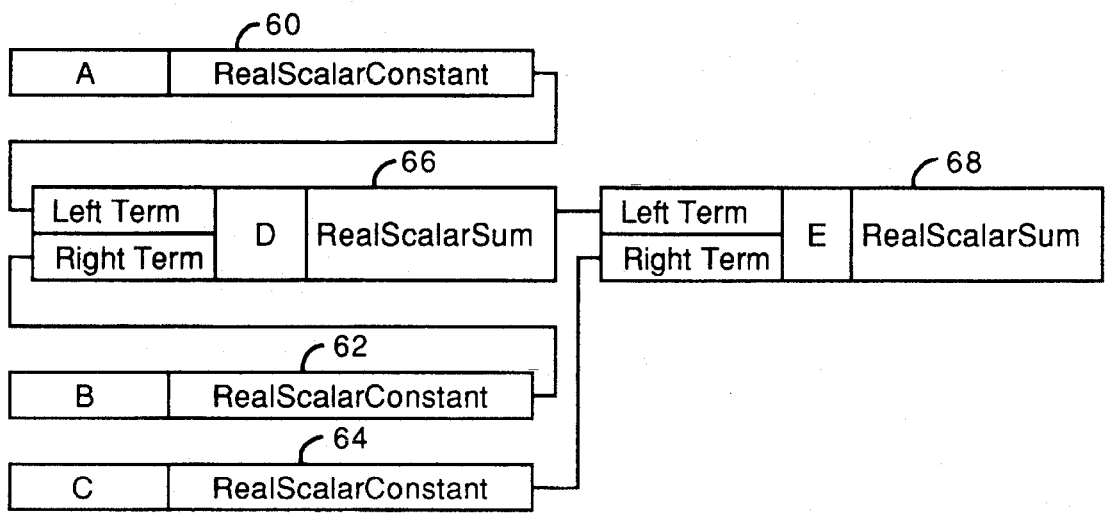
FIG. 3 is a block diagram representing an object dependency network used for specifying a program that computes a real scalar sum of three scalar constants in a manner according to this invention.

Messages can be described with reference to FIG. 3, which shows a dependency network of five tools. Tools 60, 62 and 64 are of the class RealScalarConstant, which is a subclass of the class RealScalar. The virtual state of all subclasses of type RealScalar represents a floating point number. Tools 66 and 68 are tools of class RealScalarSum, which is also a subclass of class RealScalar. Tool 66 represents a sum D of the virtual states A and B of tools 60 and 62. Tool 68 represents a sum E of the virtual states C and D of tools 64 and 66.

Whenever the virtual state of a tool changes, the tool must send an "update message" to all of its dependent tools. The method that implements the update message is specific to each tool class. When the update message is received by a dependent tool, its method must determine if its virtual state must change and decide whether any computations need to be performed. The dependent tool must then send the update message to each of its dependent tools.

Because the virtual state of a tool is characterized solely by its response to inquiry messages, a tool can defer any computations in response to an inquiry message until the time the inquiry is made rather than at the time all the virtual states of antecedent tools become available.

A tool that defers evaluation when it receives an update message from an antecedent tool simply sends an update message to all of its dependent tools without necessarily altering its own internal state. In this manner, update messages propagate through the dependency network from antecedent to dependent until a tool is encountered that requires immediate knowledge of the virtual state of its antecedent tool in the network. When this happens, the antecedent tool is queried and required to perform the computations that satisfy the query. This may, in turn, require the antecedent tool to query the virtual state of some or all of its antecedent tools, and so on, until tools are reached in the antecedent chain that can reply to the queries without further querying another antecedent tool.

For example, if tool 66 of the RealScalarSum tool class uses the deferred evaluation technique, it will defer adding the floating point values representing the virtual states of its antecedent tools 60 and 62 until it receives an inquiry message requesting its own virtual state.

Deferring evaluation until inquiry messages are received reduces required computations to only those needed to respond to the inquiries, resulting in a significant savings of computer memory utilization and computation time.

Figure 4:
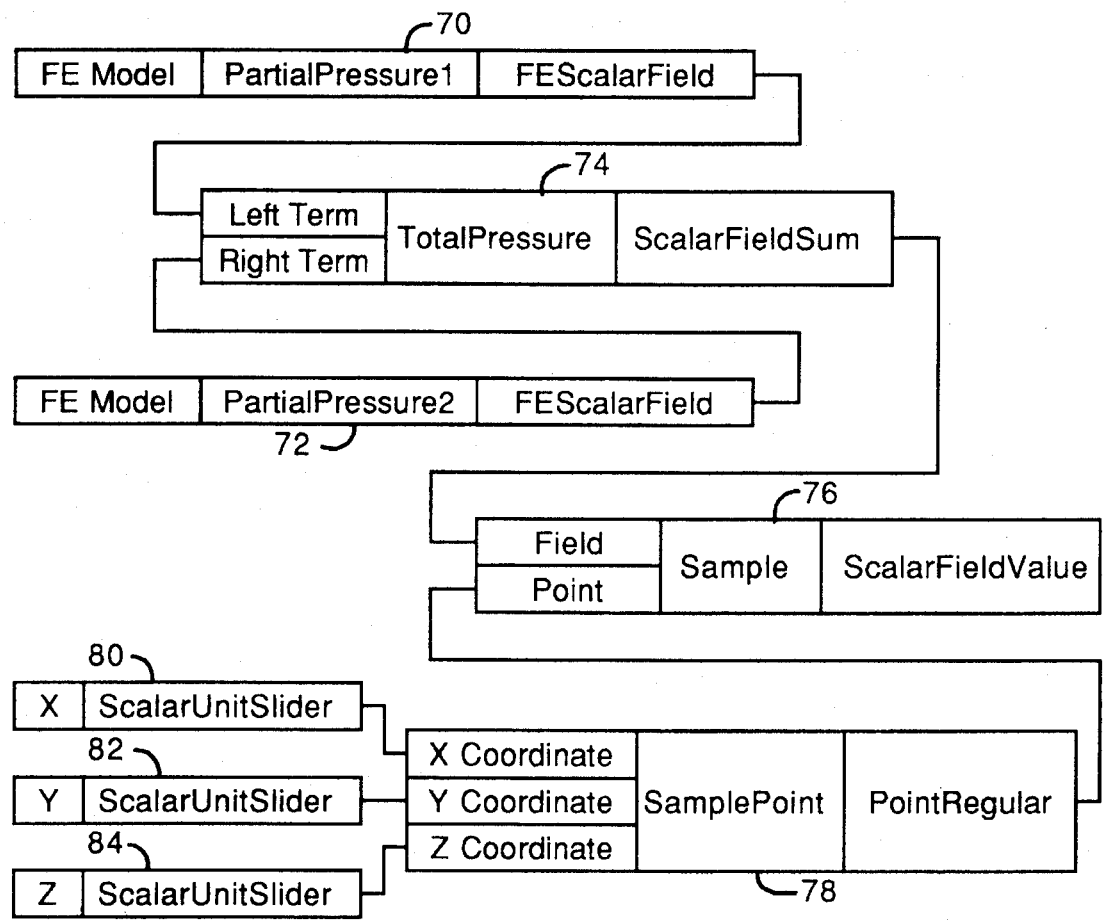
FIG. 4 is a block diagram representing an object dependency network used for specifying a program that extracts a scalar field value from a selected 3D point in a total pressure field that is generated by summing a pair of partial pressure fields in a manner according to this invention.

Another example is shown in the dependency network of FIG. 4 in which "PartialPressure" tools 70 and 72 represent two scalar pressure fields: A "TotalPressure" tool 74 represents the sum of the two partial pressure fields, and a "Sample" tool 76 finds the total pressure field value at a point represented by a "SamplePoint" tool 78.

The respective X, Y, and Z coordinate values presented to SamplePoint tool 78 are represented by ScalarUnitSlider tools 80, 82, and 84, which are examples of a user interface tool. Graphic input device 18 (FIG. 1) is a user interface device such as a mouse, joy-stick, track ball graphic tablet, or valuator dial or slider box, any of which a skilled worker could configure to provide X, Y, and Z coordinate values to ScalarUnitSlider tools 80, 82 and 84. Of course, keyboard 16 could similarly be utilized.

The partial pressure fields represented by tools 70 and 72 typically require significant memory space. In mechanical engineering applications, five to 10 megabytes is a typical memory space requirement for fields represented by finite element meshes. Without deferred evaluation, the memory space required by ScalarFieldSum tool 74 to represent the sum of the two PartialPressure fields is about the same as that required by the larger of the two PartialPressure fields. Moreover, a relatively large amount of processing time is required to generate the sum of the fields.

However, the dependency network only requires a single value of the total pressure field, and samples are typically taken at relatively few of the points in the domain represented by TotalPressure tool 74. Therefore, deferred evaluation prevents the wasteful processing of unneeded data and conserves the associated memory space.

An additional benefit of deferred evaluation is that computations may be performed more accurately. Immediate evaluation requires that an initial internal data representation be provided for the virtual state of a tool and that the results of the immediate evaluation conform to the initial representation. Mathematically complex entities, such as scalar fields, have no preferred form of data representation that fits all purposes, so any data representation may be suboptimal. However, deferred evaluation does not require an initial internal data representation.

Figure 5:
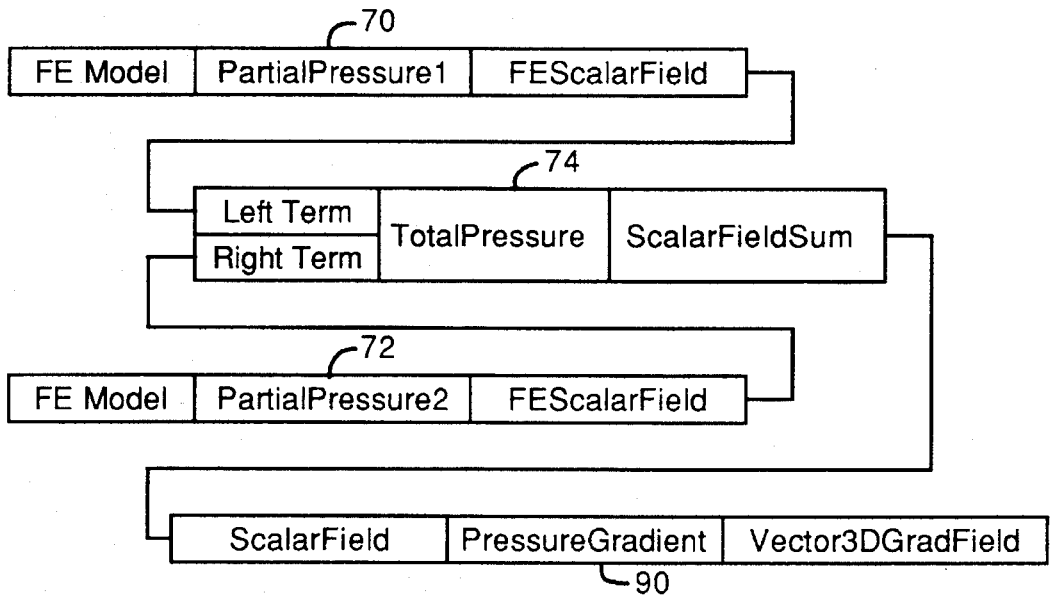
FIG. 5 is a block diagram representing an object dependency network used for specifying a program that generates a vector 3D gradient field from a scalar field sum such as the one shown in FIG. 4.

FIG. 5 shows a dependency network for computing the gradient of the ScalarFieldSum represented by TotalPressure tool 74 of FIG. 4. The computed gradient is represented in a PressureGradient tool 90. With immediate evaluation of the scalar field sum, an internal data representation of the sum field would be used to compute the gradient field. Such a data representation may have poor numerical accuracy. However, with deferred evaluation, PressureGradient tool 90 is implemented assuming that antecedent tools perform their computations accurately. This assumption leads to a technique referred to as "indirect evaluation."

For example, the following identity shows how TotalPressure tool 74 passes responsibility for its field sum computations to antecedent PartialPressure tools 70 and 72: Gradient(F+G)=Gradient F+Gradient G. The left side of the identity represents an immediate evaluation computation necessary to produce the gradient of a scalar field sum, whereas the right side shows that the gradient of the sum can be computed by summing the gradient of each of the antecedents. Therefore, a burdensome computation may be referred by tool 74 to antecedent tools 70 and 72, where it is assumed that the computation will be performed with higher accuracy. The assumption is almost always correct because antecedent tools are generally closer to the primary internal data representation of the fields.

Generally, some combination of deferred and indirect evaluation is beneficial with tools having virtual states requiring large data representations and/or complex computations or in cases where evaluation can be performed more accurately by antecedent tools that are closer to the primary data source.

Note that deferred and/or indirect evaluation are not requirements of the object dependency model. Where appropriate, immediate evaluation can be performed. For example, in the network of FIG. 3, RealScalarSum tools 66 and 68 are about equally efficient using either immediate or deferred evaluation because of their relatively small internal data representations and simple computation functions. Fortunately, the choice of immediate or deferred evaluation for a particular tool is transparent to its antecedent and dependent tools.

Another benefit of the object dependency model is its suitability for constructing user interactive programs. This invention includes tools such as ScalarUnitSlider tools 80, 82, and 84 of FIG. 4 that have no antecedents but which change their virtual state in response to user actions such as a mouse click in a display window. These "user interface" tools are a source of update messages because they have no antecedent tools.

User interactive programs are characterized by unpredictable requests for some computation or action. The unpredictability suggests that computations may be performed more efficiently in response to a user request rather than in anticipation of a request that may never be made.

The deferred evaluation technique is suitable for implementing programs in which a computation is performed only when a request is made and only if the computation is necessary to satisfy the request. Because a request is communicated by a message, and tools pass messages tools in an object dependency network are grouped into "source," "sink," and "intermediary" categories related to how messages are handled.

A source tool originates update messages without needing to receive one. The RealScalarSlider is a source tool the scalar value of which is determined by a user moving a slider control along a numeric scale.

A sink tool immediately issues one or more inquiry messages to its antecedents upon receipt of an update message and then performs some computation. A Display tool (described with reference to FIG. 6) is a sink tool that receives an update message from an antecedent tool and responds by querying a geometry-defining antecedent tool to provide image data for a display such as display 22 of FIG. 1. Sink tools do not use deferred evaluation and actually cause antecedent tools to perform previously deferred evaluations.

A sink tool can make a very specific query to an antecedent tool, such as requesting the precise data required to update itself. Because an inquiry message for specific data is sent to the antecedent tool, the antecedent tool performs only the computation necessary to satisfy the specific request often resulting in a significant savings of memory and computing time.

An intermediary tool upon receipt of an update message, sends update messages to each of its dependent tools without sending any inquiry messages to its antecedent tools. An intermediary tool utilizes deferred evaluation and does not perform a computation until response messages are received from its dependent tools, at which time it sends inquiry messages to its antecedent tools to receive required data. The inquiry messages ripple backward through the dependency network until a source tool is encountered that responds to the inquiry without querying another antecedent tool.

Programs can be constructed using object dependency networks as a basis for representing the structure and flow of the program. The components of a programming language expressed by object dependency networks are simple and few in number.

The lexical components of such a language include a set of identifiers, including "tool class names," "tool names," and "port identifiers."

Each tool class has a unique name referred to as the "tool class name." The tool class name is used to select a particular tool class for placing in the network.

Each tool must have a unique identifier that is referred to as the "tool name." The tool name is used to refer to a particular tool.

Each input port of a tool must have a unique identifier that is referred to as the "port identifier." For simplicity input ports are numbered sequentially beginning with "1" for each tool. The port number and the tool name uniquely identify a particular input port.

The object dependency network-based language also includes "statements" for creating and deleting tools and for creating and deleting connections between the tools.

A tool creating statement must specify a tool class name and a tool name.

A tool deleting statement must specify an existing tool name.

A connection creating statement must specify the antecedent tool name, the dependent tool name, and the port identifier of the dependent tool.

A connection deleting statement must specify the dependent tool name and the port identifier of the dependent tool.

Because the network-based language may be implemented in any of a variety of forms, the form of statements may vary considerably. In a simple form, statements are calls to C++ language functions. For example, the tool creating statement is a call to a C++ constructor of the tool class. A returned C++ pointer functions as the tool name. The tool deleting statement is a call to the C++ destructor of the tool class. In a more preferred form, blocks representing the statements are preferably selected, arranged, and interconnected using graphical techniques described below.

The tool creating statement creates an "instance" of an object representing the tool. When the tool is created, computations required to initialize its internal state are performed and the tool name is registered in a directory of existing tools. No computations may be performed using the virtual state of another tool because the tool is not yet interconnected.

The tool deleting statement performs clean-up functions and removes the tool name from the directory of existing tools.

The connection creating statement causes the antecedent tool to record the dependent tool identification so that update messages can be properly sent. The antecedent tool then sends an update message informing the dependent tool that a connection has been made and whether the antecedent tool virtual state is available.

The connection deleting statement causes the antecedent tool to send an update message informing the dependent tool that the connection is being broken.

When tools and connections are created, certain computations may take place. An object dependency network is never invalid or incomplete in the sense that update messages cannot be sent, which in turn means that the object dependency network program is always "running." A network can, therefore, be constructed that performs a computation, wherein the network is later altered to perform other or additional computations, all without having to restart or "recompile" the network.

The above-described dependency networks are preferably constructed using well-known interactive graphics techniques in which each statement corresponds to a sequence of interactive graphic-based actions.

For example, a user may create a tool by selecting the tool class name from a menu and typing the tool name into a dialog box. A tool icon, similar to the tool "blocks" shown in FIGS. 2–5, appears in a graphic block editor workspace window on display 22 (FIG. 1) and is positioned by "dragging" with a graphic input device 18 such as a mouse.

The tool may be deleted by selecting the tool icon by some cursor action such as a "mouse click" and then selecting "Delete" from an action menu.

A connection may be created by selecting an antecedent tool icon followed by selecting an input port on a dependent tool icons thereby drawing a line from the antecedent tool to the input port of the dependent tool.

The connection may be deleted by selecting the connection line and then selecting "Delete" from the action menu.

Because an object dependency network is always valid, the graphic block editor may be treated as an extension of an object dependency network user interface.

Computations may be inhibited by deleting connections because a typical computation cannot occur unless the required antecedents are available. Furthermore, a computation will not occur unless one or more dependent sink tools are connected.

Additional tools may be added and connected at any time without recompiling or restarting the network. This is important when adding a tool to a network in which a lengthy computation has already occurred and the result of that computation is still required. Any network change that does not invalidate a prior computation will not cause recomputation.

A tool may be replaced at any time with a tool of a compatible type. Assume that a network has a user manipulatable RealScalarSlider tool to produce a scalar value. After some experimentation, the user determines that the scalar value should be set to some desired number. The RealScalarSlider tool may be replaced by a RealScalarConstant tool having the desired number as a fixed value.

The following example shows how a moderately complex visualization problem is set up using the graphic block editor to construct a suitable object dependency network. The example problem may be stated as follows:

Given two 3D scalar data fields, $F_1$ and $F_2$, where both fields are defined over the same domain, find the rate of change of $F_2$ on regions of constant value of $F_1$.

A dependency network is developed in which appropriately interconnected tools define a program that generates a display of color contours of the field |Gradient $F_2$| mapped on an iso-valued surface of $F_1$.

Figure 6:
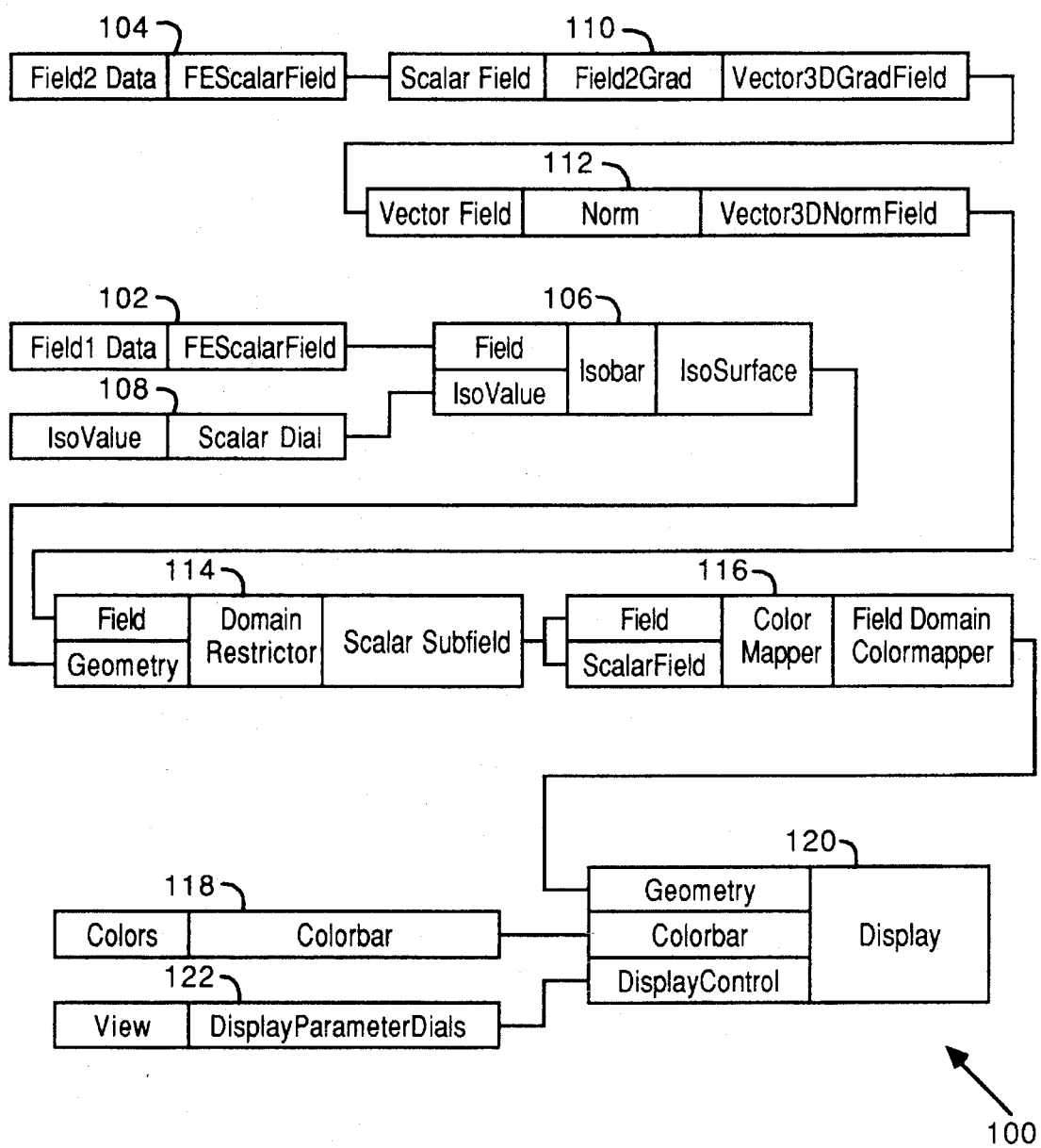
FIG. 6 is a block diagram representing an object dependency network generated by a graphic block editor in which the network specifies a program that causes the system of FIG. 1 to graphically display an image showing a rate of change of a second data field on regions of constant value in a first data field.

FIG. 6 represents a graphics block editor display showing a dependency network 100 that is suitable for solving the problem. Dependency network 100 is designed by interconnecting graphic blocks that are each associated with an appropriate tool as described above with reference to programming language statements for creating and deleting tools and connections.

Figure 7:
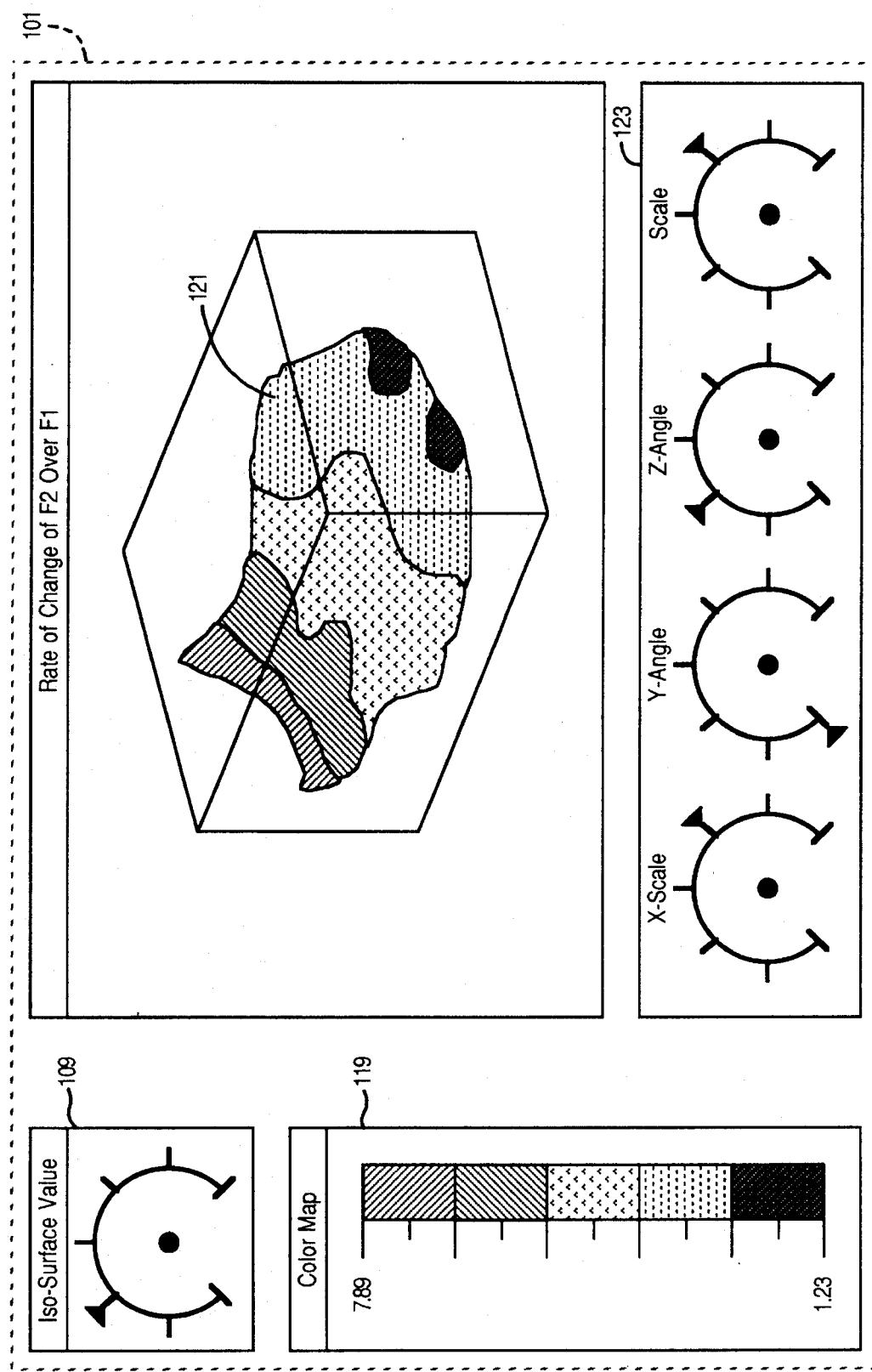
FIG. 7 depicts the graphically displayed image of FIG. 6 as second data field rate of change contours color-coded and mapped on an iso-valued surface of the first data field.

The image of dependency network 100 represented by FIG. 6 appears in a first workspace window on a display such as display 22 (FIG. 1). FIG. 7 represents a visualization solution image 101 resulting from running a program created by dependency network 100. Visualization solution image 101 appears in a second workspace window on the display.

With reference to FIGS. 6 and 7, a field1 data block 102 creates an interface between the F1 data field and the underlying program. The F1 data field has a known format and data type and represents a scalar field defined over a domain defined in terms of a finite element mesh.

A field2 data block 104 similarly creates an interface between the F2 data field and the underlying program.

An iso-valued surface block 106 creates a tool that extracts a scalar valued iso-valued surface from the F1 data file represented by field data block 102. The underlying iso-valued surface tool defines a surface as an interconnected web of small polygons.

A user interface block 108 creates a scalar value tool that causes a dial object 109 to appear on the display. An angular position of a displayed dial pointer determines the scalar value that user interface block 108 provides to the underlying program represented by iso-valued surface block 106.

A gradient field block 110 creates a tool that computes a gradient (vector) field of a scalar field.

A norm block 112 creates a tool that produces a scalar field that is the mathematical norm of the vector field computed in response to gradient field block 110. Large valued regions in the norm field correspond to rapidly changing regions of the $F_2$ data field.

A domain restrictor block 114 creates a tool that computes a scalar subfield having values extracted from the norm field corresponding to norm block 112 defined over the iso-valued domain corresponding to iso-valued surface block 106.

A color mapper block 116 creates a color mapping tool that associates a color value with each value of the domain restricted field corresponding to domain restrictor block 114. The association (mapping) of field values to color values is determined by a user interface block 118 that creates a color bar tool. The color bar tool opens a window 119 on the display that shows the color-to-value mapping as a numerically labeled color bar. A color bar editor function is provided for interactively altering the color-to-value mapping.

A display block 120 creates a display window tool that renders an image of the field data 121 associated with domain restrictor block 114. Image 121 has colors that are defined by user actions associated with dial object 109 and color bar window 119.

A user interface block 122 creates a tool that renders a set of dial objects 123 on the display for user control of viewing parameters such as X, Y, and Z viewing transforms.

Visualization solution image 101 may be created in the second workspace window with or without the dependency network 100 block editor window being visible. Any of dial object 109, color bar window 119, or dial objects 123 may be user manipulated at any time. If, for example, dial object 109 controlling the scalar iso-surface value is changed visualization solution image 121 in the second workspace window will update automatically.

Dependency network 100 can be saved for reuse with or without specifying specific file names in data blocks 102 and 104. Dependency network 100 may be saved to any library of dependency networks or tools with a corresponding menu entry being created in a library menu. To rerun or use the network as the basis of a new network, the user selects network 100 from the library menu. Two text entry windows are displayed requesting file names for association with data blocks 102 and 104. In response, dependency network 100 produces visualization solution image 101 including its corresponding image of field data 121.

Skilled workers can implement the Kernel class, other classes, and suitable dependency networks by using the following exemplary coding as a guide. The exemplary coding follows a pseudo-code form based on the C++ programming language. Pseudo-code blocks that may not follow C++ rules are enclosed by angle brackets <>.

Some coding detail is omitted such as error checking, constructing and traversing dependency lists, and tool destructors, but workers skilled in the C++ language can easily provide such details.

The Kernel class is the root class of all tool classes and it implements all functionality which is common to its subclasses.

```
class Kernel
{
    private:
        DependentList* dependents;
            // This is a list of some sort which
            // contains pointers to each of the
            // tools dependent on this tool.
        PortArray* port;
            // This is an array of unspecified
            // size which has an entry for each
            // input port of the tool. An entry
            // of the array stores a pointer to
            // a tool. The array is accessed and
            // modified by the following messages:
            //
            // port -> addAntecedent
            // (
            // Kernel* antecedent,
            // int portNumber
            // );
            //
            // Kernel* antecedent =
            // port -> antecedentAt
            // (int portNumber);
    protected:
```

-continued
```
        Boolean available;
            // This variable notes if the virtual
            // state of the tool is available.
    public:
        Kernel ();
            // Constructor for class;
        Boolean availability ();
            // This method returns the current
            // availability of the virtual state
            // of the tool.
        void addDependent (Kernel* dependent);
            // This method adds a dependent to
            // the dependent list.
        void deleteDependent (Kernel* dependent);
            // This method is the inverse of
            // the addDependent method.
        void makeConnection
        (
            Kernel* antecedent,
            int portNumber
        );
            // This method will add the antecedent
            // argument to the specified port and
            // will add the receiving object's
            // pointer to the dependent list of
            // the sender of the message.
        void deleteConnection (int portNumber);
            // This method is the inverse of the
            // makeConnection method.
        void changed ();
            // This method is used to cause all
            // dependents to receive the update
            // message.
        virtual void update (Boolean available);
            // This virtual function may be
            // implemented specially for each
            // tool class or the default
            // default implementation may be
            // used if deferred evaluation is
            // desired. It is the method
            // which implements the update
            // messages from antecedents.
};
Kernel::Kernel ()
{
    <initialize all data structures>
}
void Kernel::makeConnection
(
    Kernel* antecedent,
    int portNumber
)
{
    this -> port -> addAntecedent
    (antecedent, portNumber);
    antecedent -> addDependent (this);
    available = TRUE;
    <for each antecedent of the tool>
    {
        available &= antecedent -> availability ();
    }
        // Determine the current availability
        // of the tool.
    this -> changed ();
        // Send the changed message to the tool.
}
void Kernel::deleteConnection (int portNumber)
{
    Kernel* antecedent =
    this -> port -> antecedentAt (portNumber);
    this -> port -> addAntecedent
    (NULL, portNumber);
    antecedent -> deleteDependent (this);
    available = FALSE;
        // The tool is no longer available because
        // it is missing an antecedent.
    this -> changed ();
        // Cause dependents to get update message
        // to notify them that something has changed.
}
void Kernel::changed ()
{
    <for each dependent in the dependent list>
    {
        dependent -> update (available);
    }
}
void Kernel::update (Boolean antecedentAvailable)
{
    this -> available &= antecedentAvailable;
        // Compute current availability of this tool.
    this -> changed (available);
}
```

The scalar field classes implement scalar fields as a new data type. For any point in space, the scalar value and gradient vector of a scalar field can be determined. The scalar field class is the base class for all scalar field objects. The inquiry functions for this class are all virtual and are, therefore, implemented in each subclass.

```
class ScalarField: public Kernel
{
    public:
        virtual Scalar* valueAt (Point* point);
            // This method returns the scalar
            // value of the scalar field at the
            // specified point.
        virtual Vector* gradientAt (Point* point);
            // This method returns the gradient
            // vector of the scalar field at the
            // specified point.
}
```

The FEScalarField class implements a type of scalar field that is defined in terms of a finite element mesh having scalar values at the mesh nodes. Finite element mesh details are not important in this description, except for the fact that scalar fields defined by a mesh often require very large amounts of computer memory. Objects of this class have no antecedents. The data defining the finite element mesh is primary data typically created by a finite element analysis program.

```
class FEScalarField: public ScalarField
{
    public:
        FEScalarField ();
            // Constructor for the class.
        Scalar* valueAt (Point* point);
            // This method will implement
            // algorithms for determining the
            // value of the scalar field based
            // on the finite element model used
            // to represent the field.
        Vector* gradientAt (Point* point);
            // This method will implement
            // algorithms for determining the
            // gradient of the scalar field based
            // on the finite element model used
            // to represent the field.
};
FEScalarField::FEScalarField ()
{
    <read finite element data from file and
    construct all required data structures.>
    available = TRUE;
        // This tool has no antecedents so it will
        // always be available.
}
```

-continued
```
class ScalarFieldSum: public ScalarField
{
    public:
        ScalarFieldSum ();
            // Constructor for the class.
        Scalar* valueAt (Point* point);
            // This method implements deferred
            // evaluation of its result.
        Vector* gradientAt (Point* point);
            // This method implements deferred
            // evaluation of its result and
            // passes the significant part of
            // the computation (the evaluation
            // of derivatives) back to its
            // antecedents.
};
ScalarFieldSum::ScalarFieldSum ()
{
    available = FALSE;
        // Tool initially has no connected
        // antecedents so it is unavailable.
}
Scalar* ScalarFieldSum::valueAt (Point* point)
{
    (ScalarField*) antecedent1 =
    this -> antecedentAt (1);
    (ScalarField*) antecedent2 =
    this -> antecedentAt (2);
    if
    (
        (antecedent1 -> available ()) &&
        (antecedent2 -> available ())
    )
    {
        return
        antecedent1 -> valueAt (point) +
        antecedent2 -> valueAt (point);
    }
    else return NULL;
}
Vector* ScalarFieldSum::gradientAt (Point* point)
{
    (ScalarField*) antecedent1 =
    this -> antecedentAt (1);
    (ScalarField*) antecedent2 =
    this -> antecedentAt (2);
    if
    (
        (antecedent1 -> available ()) &&
        (antecedent2 -> available ())
    )
    {
        return
        antecedent1 -> gradientAt (point) +
        antecedent2 -> gradientAt (point);
    }
    else return NULL;
}
        VectorField classes implement vector fields as a
new data type. The VectorField class is the base class of
all vector field tools.
class VectorField: public Kernel
{
    public:
        virtual Vector* valueAt (Point* point);
            // This method returns the vector
            // value of the vector field at the
            // specified point.
};
class GradientField: public VectorField
{
    public:
        GradientField ();
            // Constructor for the class.
        Vector* valueAt (Point* point);
};
Vector* GradientField::valueAt (Point* point)
{
    (ScalarField*) antecedent =
```

-continued
```
    this -> antecedentAt (1);
    if (antecedent -> available ())
    {
        return antecedent1 -> gradientAt (point);
    }
    else return NULL;
}
```

A code fragment is shown below for constructing the dependency network shown in FIG. 5. The code may alternatively be replaced by a program that responds to user actions in a graphic block editor window and which interprets those user actions to create the indicated messages.

```
ScalarField* partialPressure1 = new FEScalarField ();
ScalarField* partialPressure2 = new FEScalarField ();
ScalarField* totalPressure = new ScalarFieldSum ();
VectorField* pressureGrad = new Vector3DGradient ();
    // Create each of the tools required for the network.
totalPressure -> makeConnection (partialPressure1, 1);
totalPressure -> makeConnection (partialPressure2, 2);
pressureGrad -> makeConnection (totalPressure, 1);
    // Connect each of the tools.
```

Skilled workers will realize that alternate forms exist for portions of this invention. For example, the invention may be used to manipulate and visualize data types other than fields using tools different than and/or in addition to those described. The tools may be interconnected with or without a graphic block editor, and of course, a language other than C++ may be used for implementing all or part of this invention.

It will be obvious to those having skill in the art that many changes may be made to the details of the above-described embodiment of this invention without departing from the underlying principles thereof. Accordingly, it will be appreciated that this invention is also applicable to programming applications other than those entailing data visualization. The scope of the present invention should be determined, therefore, only by the following claims.

I claim:

1. In a computer including a processor, a memory, a graphic input device, and a display, a method executed by the computer for analyzing information contained in a data field, comprising the steps of:

storing in the memory a Kernel class data structure executable by the processor to at least one of create, delete, interconnect, and communicate between instances of tool classes, each instance of a tool class having a first address pointer identifying a memory location storing a data structure defining a state of the instance of the tool class and a second address pointer identifying a memory location defining an interconnection port to the instance of the tool class;

storing the data field in the memory at a first memory location;

creating with the Kernel class data structure an instance of a data field tool class having the first address pointer identifying the first memory location;

creating with the Kernel class data structure an instance of a process tool class having the first address pointer identifying a second memory location storing a processor executable process;

interconnecting with the Kernel class data structure the interconnection port of the instance of the data field tool class and the interconnection port of the instance of the process tool class;

requesting by the instance of the process tool class a state of the instance of the data field tool class;

receiving at the instance of the process tool class values of the data field representing the state of the instance of the data field tool class; and processing the received values of the data field according to the processor executable process identified by the instance of the process tool class.

2. The method of claim 1 in which the data field is one of a scalar data field, a vector data field, and a tensor data field.

3. The method of claim 1 in which the kernel class data structure further assigns a class type to each of the interconnection ports and the interconnecting step is carried out between interconnection ports of a same class type.

4. The method of claim 1 in which each instance of the tool class further includes a third address pointer identifying a memory location storing a data structure defining a displayable object representing the tool class, the method further comprising the steps of:

storing in the memory a graphic editor executable by the processor to interface the graphic input device and the Kernel class data structure;

employing the graphic input device to initiate execution of the creating and interconnecting steps;

retrieving from the memory the displayable objects representing the created instances of a tool classes; and displaying on the display the displayable objects representing the created instances of the tool classes and a graphical line representing the interconnection formed between the interconnection ports by the interconnecting step.

5. The method of claim 1 further comprising the steps of:

creating with the Kernel class data structure an instance of a display tool class having the first address pointer identifying a third memory location storing a processor executable display driver process;

interconnecting with the Kernel class data structure the interconnection port of the instance of the process tool class and an interconnection port of the instance of the display tool class;

requesting by the instance of the display tool class a state of the instance of the process tool class;

receiving at the instance of the display tool class from the instance of the process tool class the processed received values of the data field; and displaying on the display in a format defined by the display driver process the processed received values of the data field.

6. The method of claim 5 in which the instance of the process tool class defers the processing step until the requesting by the instance of the display tool class step is executed.

7. In a computer including a processor, a memory, a graphic input device, and a display, a method executed by the computer for analyzing information contained in first and second data fields, comprising the steps of:

storing in the memory a Kernel class data structure executable by the processor to at least one of create, delete, interconnect, and communicate between instances of tool classes, each instance of a tool class having a first address pointer identifying a memory location storing a data structure defining a state of the instance of the tool class and at least a second address pointer identifying at least one memory location forming at least one interconnection port to the instance of the tool class;

storing the first and second data fields in the memory at respective first and second memory locations;

creating with the Kernel class data structure instances of a first data field tool class and a second data field tool class having the first address pointers identifying the respective first and second memory locations;

creating with the Kernel class data structure an instance of a process tool class having the first address pointer identifying a third memory location storing a processor executable process;

interconnecting with the Kernel class data structure the interconnection port of the instance of the first data field tool class and a first input interconnection port of the instance of the process tool class;

interconnecting with the Kernel class data structure the interconnection port of the instance of the second data field tool class and a second input interconnection port of the instance of the process tool class;

requesting by the instance of the process tool class a state of the instances of the first and second data field tool classes;

receiving at the instance of the process tool class values of the first and second data fields representing the respective states of the instances of the first and second data field tool classes; and processing the received values of the first and second data fields according to the processor executable process identified by the instance of the process tool class.

8. The method of claim 7 in which the first and second data fields are one of a scalar data field type, a vector data field type, and a tensor data field type.

9. The method of claim 7 in which the kernel class data structure further assigns a class type to each of the interconnection ports and the interconnecting steps are carried out between interconnection ports of a same class type.

10. The method of claim 7 in which each instance of the tool class further includes a third address pointer identifying a memory location storing a data structure defining a displayable object representing the tool class, the method further comprising the steps of:

storing in the memory a graphic editor executable by the processor to interface the graphic input device and the Kernel class data structure;

employing the graphic input device to initiate execution of the creating and interconnecting steps;

retrieving from the memory the displayable objects representing the created instances of a tool classes; and displaying on the display the displayable objects representing the created instances of the tool classes and graphical lines representing the interconnections formed between the interconnection ports by the interconnecting steps.

11. The method of claim 7 further comprising the steps of:

creating with the Kernel class data structure an instance of a display tool class having a first address pointer identifying a fourth memory location storing a processor executable display driver process;

interconnecting with the Kernel class data structure an output interconnection port of the instance of the process tool class and an input interconnection port of the instance of the display tool class;

requesting by the instance of the display tool class a state of the instance of the process tool class;

receiving at the instance of the display tool class from the instance of the process tool class the processed received values of the first and second data fields; and displaying on the display in a format defined by the display driver process the processed received values of the first and second data fields.

12. The method of claim 11 in which the instance of the process tool class defers the processing step until the requesting by the instance of the display tool class step is executed.

13. The method of claim 7 further comprising the steps of:

creating with the Kernel class data structure an instance of an antecedent tool class having the first address pointer identifying a fourth memory location storing a processor executable process;

interconnecting with the Kernel class data structure an output interconnection port of the instance of the process tool class and an input interconnection port of the instance of the antecedent tool class;

receiving by the antecedent tool class from an instance of a dependent tool class a request for a state of the instance of the antecedent tool class;

referring to the instance of the process tool class an indirect evaluation required by the instance of the antecedent tool class to satisfy the request;

receiving at the instance of the antecedent tool class from the instance of the process tool class a result of the indirect evaluation; and sending the state of the antecedent tool class to the instance of the dependent tool class.

* * * * *